United States Patent
Bremer et al.

(10) Patent No.: US 6,196,723 B1
(45) Date of Patent: Mar. 6, 2001

(54) DYNAMIC GROOVE BEARING COMPRISING A POROUS LUBRICANT RESERVOIR

(75) Inventors: Fridtjof Bremer; Johannes M. M. Hensing, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/356,599

(22) Filed: Jul. 19, 1999

(30) Foreign Application Priority Data

Jul. 17, 1998 (EP) .................................................. 98202405

(51) Int. Cl.⁷ .................................................. F16C 32/06
(52) U.S. Cl. .................................................. 384/114; 384/100
(58) Field of Search .................................................. 384/100, 107, 384/111, 113, 114, 115, 118

(56) References Cited

U.S. PATENT DOCUMENTS

| | | | |
|---|---|---|---|
| 4,596,474 | * | 6/1986 | Van Roemburg ................. 384/100 X |
| 5,112,141 | * | 5/1992 | Asada et al. ......................... 384/100 |
| 5,141,338 | * | 8/1992 | Asada et al. ..................... 384/100 X |
| 5,647,672 | * | 7/1997 | Fukutani .............................. 384/100 |
| 5,716,141 | * | 2/1998 | Chen ............................... 384/100 X |
| 5,806,987 | * | 9/1998 | Nose et al. ............................ 384/100 |
| 5,810,481 | * | 9/1998 | Nii et al. ........................... 384/107 X |
| 5,834,870 | * | 11/1998 | Tokushima et al. ............. 384/107 X |
| 5,941,646 | * | 8/1999 | Mori et al. ....................... 384/100 X |
| 6,000,850 | * | 12/1999 | Takahashi et al. ................... 384/114 |

FOREIGN PATENT DOCUMENTS

| | | |
|---|---|---|
| 0265005A1 | 4/1988 | (EP) . |
| 08322191 | 12/1996 | (JP) . |
| 8322191 | 12/1996 | (JP) . |
| 9303398 | 11/1997 | (JP) . |

* cited by examiner

Primary Examiner—Rodney H. Bonck
(74) Attorney, Agent, or Firm—David R. Treacy

(57) ABSTRACT

The invention relates to a dynamic groove bearing (9) comprising an internal bearing part (23) and an external bearing part (17) which are rotatable relatively to each other about an axis of rotation (7), a bearing surface (31, 35) of one of the bearing parts comprising two grooves for co-operation with a bearing surface (39) of the other bearing part. The groove bearing further comprises a reservoir made from a porous material for a lubricant which is present between the bearing surfaces. According to the invention, the reservoir is mounted between the two groove patterns, viewed in a direction parallel to the axis of rotation. In this manner, a uniform supply of the lubricant from the reservoir to the two groove patterns is obtained, while also the number of parts of the groove bearing is limited. In a preferred embodiment, the reservoir comprises a ring-shaped body (29) which is made from the porous material and mounted in the external bearing part. The ring-shaped body may be confined between two bearing bushes (25, 27) of the external bearing part on which the two groove patterns are present. The ring-shaped body may further comprise at least one air-vent duct (57, 59, 61, 63). The dynamic groove bearing according to the invention can be used in an electric motor (1) for driving a rotatable support (83) for an information carrier (89) in a scanning device (81), such as an optical disc player.

11 Claims, 2 Drawing Sheets

DYNAMIC GROOVE BEARING COMPRISING A POROUS LUBRICANT RESERVOIR

BACKGROUND OF THE INVENTION

The invention relates to a dynamic groove bearing comprising an internal bearing part and an external bearing part which can be rotated relatively to each other about an axis of rotation, a bearing surface of one of the bearing parts being provided with two groove patterns for co-operation with a bearing surface of the other bearing part, which groove patterns, viewed parallel to the axis of rotation, are spaced apart, and the groove bearing being provided with a reservoir made from a porous material for holding a lubricant which, in operation, is present between the co-operating bearing surfaces.

The invention further relates to an electric motor comprising a stator and a rotor, which is mounted so a to be rotatable with respect to the stator by means of a dynamic groove bearing.

The invention also relates to a scanning device provided with a support for an information carrier and a scanning unit for scanning the information carrier, said support being rotatable about an axis of rotation by means of an electric motor, while the scanning unit can be displaced with respect to the support at least in a direction transverse to the axis of rotation by means of a displacement device.

A dynamic groove bearing of the type mentioned in the opening paragraph is known from JP-A-08322191. The internal bearing part of the known groove bearing is a shaft, and the external bearing part of the known groove bearing is a bush, the shaft being rotatable in the bush. The groove patterns of the known groove bearing are provided on the shaft. During rotation of the shaft in the bush, the groove patterns generate an overpressure in the lubricant which is present between the co-operating bearing surfaces of the shaft and the bush, so that the shaft is supported in a direction perpendicular to the axis of rotation. The reservoir of the known groove bearing comprises two ring-shaped bodies which are made from a sintered metal and are each secured in the bush near an end of the bush. By using the reservoir, a quantity of a lubricant is present in the known groove bearing, which quantity is much greater than a quantity of lubricant present between the co-operating bearing surfaces. As a result, ageing of the lubricant, which is predominantly caused by a chemical reaction between the lubricant and the bearing metals used in the groove bearing, is retarded considerably, so that the known groove bearing has a much longer service life.

A drawback of the known dynamic groove bearing is that there may be a difference between the quantities of lubricant present in both porous ring-shaped bodies, as a result of which there is a different lubricant supply to both groove patterns, which leads to improper operation of the groove bearing. In addition, the known dynamic groove bearing comprises a relatively large number of parts, which can be attributed to the use of the two porous ring-shaped bodies.

SUMMARY OF THE INVENTION

It is an object of the invention to provide a dynamic groove bearing of the type mentioned in the opening paragraph, which enables the lubricant supply to both groove patterns of the groove bearing to be as uniform as possible, while the number of parts is reduced to a minimum.

To achieve this, the dynamic groove bearing in accordance with the invention is characterized in that, viewed parallel to the axis of rotation, the reservoir is arranged between the two groove patterns. Since, viewed parallel to the axis of rotation, the reservoir is arranged between the two groove patterns, the groove bearing comprises a single centrally arranged reservoir for the lubricant, from which reservoir both groove patterns are provided with lubricant. The central arrangement of the single reservoir between the two groove patterns enables a substantially symmetrical and extremely uniform lubricant supply to the two groove patterns to be obtained, while the number of parts of the groove bearing is limited.

A particular embodiment of a dynamic groove bearing in accordance with the invention is characterized in that the reservoir comprises a ring-shaped body made from the porous material, which body is arranged in the external bearing part. The ring-shaped body can be manufactured in a simple way and can be readily provided in the external bearing part.

A further embodiment of a dynamic groove bearing in accordance with the invention is characterized in that the two groove patterns are provided on an inner wall of, respectively, a first bearing bush and a second bearing bush, which form part of the external bearing part, the ring-shaped body, viewed parallel to the axis of rotation, being retained between the two bearing bushes. The use of the two above-mentioned bearing bushes enables the external bearing part with the ring-shaped body provided therein to be assembled in a simple and practical manner. The ring-shaped body is directly adjacent to the two above-mentioned bearing bushes on which the groove patterns are provided, so that the distance to be bridged by the lubricant from the ring-shaped body to the groove patterns is as short as possible.

Yet another embodiment of a dynamic groove bearing in accordance with the invention is characterized in that the ring-shaped body has an internal diameter which is larger than an internal diameter of the bearing surface of the external bearing part. Since the internal diameter of the ring-shaped body is larger than the internal diameter of the bearing surface of the external bearing part, a lubricant meniscus develops near the interfaces between the ring-shaped body and the co-operating bearing surfaces as a result of capillary liquid forces prevailing between the co-operating bearing surfaces, which lubricant meniscus is fed from the ring-shaped body. In this manner, a reliable, uninterrupted lubricant supply to both groove patterns is obtained.

A particular embodiment of a dynamic groove bearing in accordance with the invention is characterized in that the ring-shaped body is provided with at least one vent duct which extends from an inner wall of the ring-shaped body to an outer wall of the ring-shaped body and opens, near the outer wall of the ring-shaped body, into a vent line of the external bearing part. Said vent duct serves to vent air from the dynamic groove bearing when the groove bearing is being filled with the lubricant. Since the vent duct is provided in the ring-shaped body arranged between the two groove patterns, a necessary mutual decoupling of the pressure profiles generated by the two groove patterns is also provided. In the course of the manufacture of the ring-shaped body, the vent duct can be readily provided in said ring-shaped body, so that a particularly practical construction of the dynamic groove bearing is obtained.

A further embodiment of a dynamic groove bearing in accordance with the invention is characterized in that the ring-shaped body is provided with a first vent duct which, close to one of the two groove patterns, opens into the inner wall of the ring-shaped body, and a second vent duct which, close to the other groove pattern, opens into the inner wall of the ring-shaped body, the two vent ducts opening into a ring-shaped duct of the external bearing part, close to the outer wall of the ring-shaped body, which ring-shaped duct surrounds the ring-shaped body and forms part of the vent line. By using said two vent ducts, air venting of the dynamic groove bearing, when this groove bearing is being filled with the lubricant, is improved. The above-mentioned ring-shaped duct of the external bearing part can be readily provided in the external bearing part and is common to the two above-mentioned vent ducts of the ring-shaped body.

Yet another embodiment of a dynamic groove bearing in accordance with the invention is characterized in that the ring-shaped body is provided with two vent ducts which are diametrically arranged with respect to each other and which open into the inner wall of the ring-shaped body, close to one of the two groove patterns, and with two vent ducts which are diametrically arranged with respect to each other and which open into the inner wall of the ring-shaped body, close to the other groove pattern. By using said two pairs of vent ducts which are diametrically arranged with respect to each other, air venting from the dynamic groove bearing during filling the groove bearing with the lubricant is further improved.

An electric motor of the type mentioned in the opening paragraphs is characterized in accordance with the invention in that the dynamic groove bearing used therein is a dynamic groove bearing in accordance with the invention, the stator being secured to one of the bearing parts of the groove bearing, while the rotor is secured to the other bearing part of the groove bearing.

A scanning device of the type mentioned in the opening paragraphs is characterized in accordance with the invention in that the electric motor used therein is an electric motor in accordance with the invention.

BRIEF DESCRIPTION OF THE DRAWING

These and other aspects of the invention will be apparent from and elucidated with reference to the embodiment(s) described hereinafter.

In the drawings.

DESCRIPTION OF THE PREFERRED EMBODIMENTS

Figure 1:
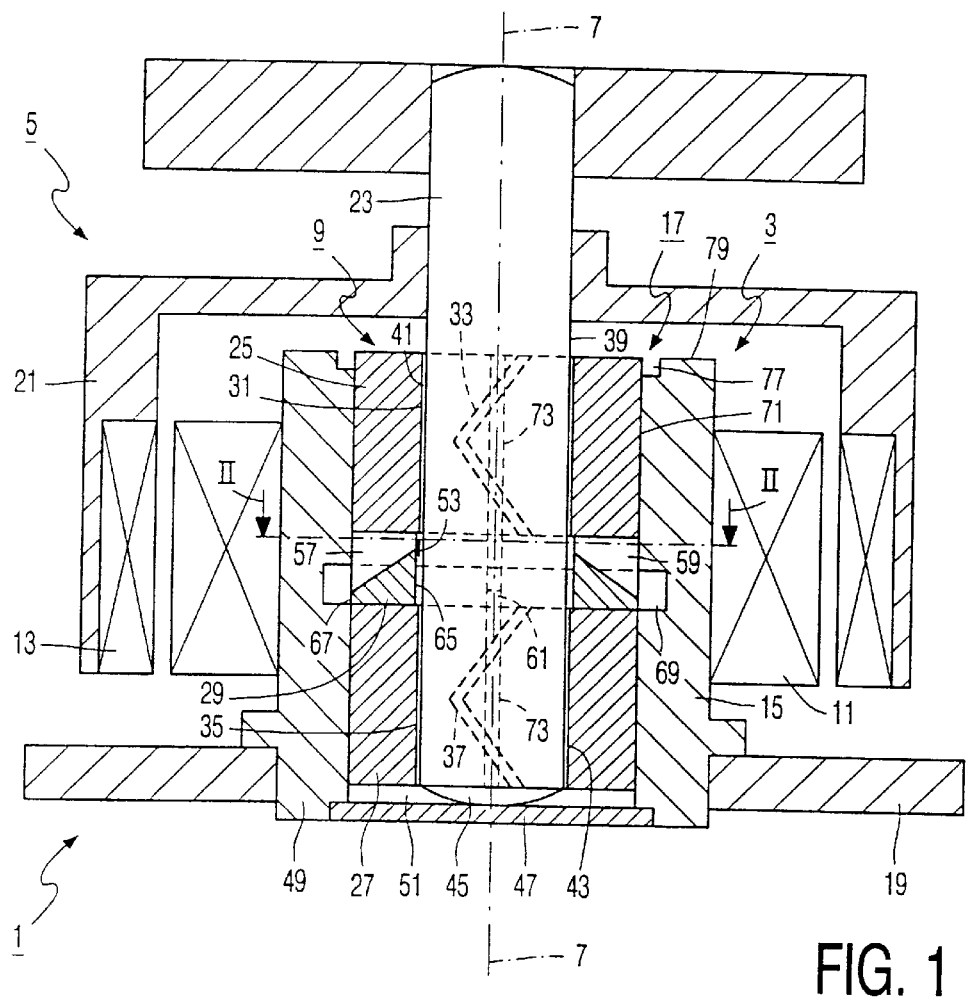
FIG. 1 diagrammatically shows an electric motor in accordance with the invention, which is provided with a dynamic groove bearing in accordance with the invention.

FIG. 1 diagrammatically shows an electric motor 1 in accordance with the invention comprising a stator 3 and a rotor 5 which, relative to the stator 3, is mounted so as to be rotatable about an axis of rotation 7 by means of a dynamic groove bearing 9 in accordance with the invention. The stator 3 comprises a system 11 of electric coils, which is only diagrammatically shown in FIG. 1, while the rotor 5 includes a system 13 of permanent magnets, only diagrammatically shown in FIG. 1, for co-operation with the system 11 of electric coils. The system 11 of electric coils is secured to a bush-shaped bearing housing 15 which forms part of an external bearing part 17 of the dynamic groove bearing 9 and is secured to a stationary base plate 19 of the electric motor 1. The system 13 of permanent magnets is secured to a ring-shaped magnet holder 21 which is secured to a steel shaft 23. Said shaft 23 forms an internal bearing part of the dynamic groove bearing 9 and its center line substantially coincides with the axis of rotation 7.

As FIG. 1 also shows, the external bearing part 17 of the dynamic groove bearing 9 also includes a first bronze bearing bush 25, a second bronze bearing bush 27 which, viewed parallel to the axis of rotation 7, is arranged at a distance from the first bearing bush 25, and a ring-shaped body 29 which, viewed parallel to the axis of rotation 7, is retained between the first bearing bush 25 and the second bearing bush 27. An inner side of the first bearing bush 25 is provided with a circularly cylindrical bearing surface 31 having a V-shaped groove pattern 33, while an inner side of the second bearing bush 27 is provided with a circularly cylindrical bearing surface 35 having a V-shaped groove pattern 37. It is noted that, for the sake of simplicity, only a single V-shaped groove of the two groove patterns 33, 37 is shown in FIG. 1. An outer side of the shaft 23 is provided with a circularly cylindrical bearing surface 39 for co-operation with the two groove patterns 33 and 37 which, viewed parallel to the axis of rotation 7, are spaced apart; a first, predominantly ring-shaped bearing slit 41 is situated between the bearing surface 39 of the shaft 23 and the bearing surface 31 of the first bearing bush 25, while a second, predominantly ring-shaped bearing slit 43 is situated between the bearing surface 39 of the shaft 23 and the bearing surface 35 of the second bearing bush 27. The bearing slits 41 and 43 are filled with a lubricant, such as a diester oil. During rotation of the shaft 23 in the bearing bushes 25, 27, the groove patterns 33, 37 generate an overpressure in the lubricant present in the bearing slit 41 between the co-operating bearing surfaces 31 and 39, and in the bearing slit 43 between the co-operating bearing surfaces 35 and 39. As a result of said overpressure in the bearing slits 41 and 43, the shaft 23 and the rotor 5 of the electric motor 1 secured thereto are supported in a direction perpendicular to the axis of rotation 7 with respect to the external bearing part 17 and the stator 3 of the electric motor 1 secured thereto.

As further shown in FIG. 1, the shaft 23 comprises a rounded end 45 which rests on a metal pivot plate 47, under the influence of a magnetic pre-stressing force exerted by the electric motor 1, which plate is secured to a first end 49 of the bearing housing 15. A space 51 between the pivot plate 47 and the end 45 of the shaft 23 is also filled with the lubricant. By means of the pivot plate 47, the shaft 23 and the rotors of the electric motor 1 secured thereto are supported in a direction parallel to the axis of rotation 7 with respect to the external bearing part 17 and the stator 3 of the electric motor 1 secured thereto.

The ring-shaped body 29 provided in the external bearing part 17 is made of a porous material, such as sintered bronze or a ceramic, and forms a reservoir which holds, in operation, an extra quantity of a lubricant. By using the ring-shaped body 29, the dynamic groove bearing 9 contains a quantity of lubricant which substantially exceeds the quantity of lubricant present in the bearing slits 41 and 43 and in the space 51. By virtue thereof, ageing of the lubricant, which is predominantly caused by a chemical reaction of the lubricant with the bearing materials used in the dynamic groove bearing 9, is considerably retarded. Such ageing leads to an increase in viscosity of the lubricant, which in time leads to an unacceptable current increase in the electric motor 1. Since such ageing of the lubricant is retarded considerably by using the porous ring-shaped body 29 with the extra quantity of lubricant, the service life of the dynamic groove bearing 9 is increased substantially.

In accordance with the invention, the porous ring-shaped body 29 which is embodied so as to be a reservoir for the lubricant is, viewed parallel to the axis of rotation 7, arranged between the two groove patterns 33 and 37. Since the ring-shaped body 29 is thus centrally arranged between the two groove patterns 33 and 37, a substantially symmetrical and particularly uniform lubricant supply to the two groove patterns 33 and 37 is obtained, as a result of which the dynamic groove bearing 9 provides for a uniform support of the shaft 23 in a direction perpendicular to the axis of rotation 7. Furthermore, the use of the single, ring-shaped body 29, from which both groove patterns 33 and 37 are supplied with lubricant, enables the number of parts of the dynamic groove bearing 9 to be limited. The ring-shaped body 29 can be manufactured in a simple manner. Since the ring-shaped body 29 is confined between the two bearing bushes 25 and 27, viewed parallel to the axis of rotation 7, the ring-shaped body 29 can be provided in a simple manner in the external bearing part 17 by successively pressing one of the two bearing bushes 25, 27 into the external bearing part 17, pressing the ring-shaped body 29 into the external bearing part 17 and, finally, pressing the other bearing bush 25, 27 into the external bearing part 17. In this manner, the external bearing part 17 can be assembled in a simple and practical manner. As the ring-shaped body 29 is directly adjacent to the two bearing bushes 25 and 27 on which the groove patterns 33 and 37 are provided, the distance to be bridged by the lubricant from the ring-shaped body 29 to the groove patterns 33 and 37 is minimized.

Figure 3:
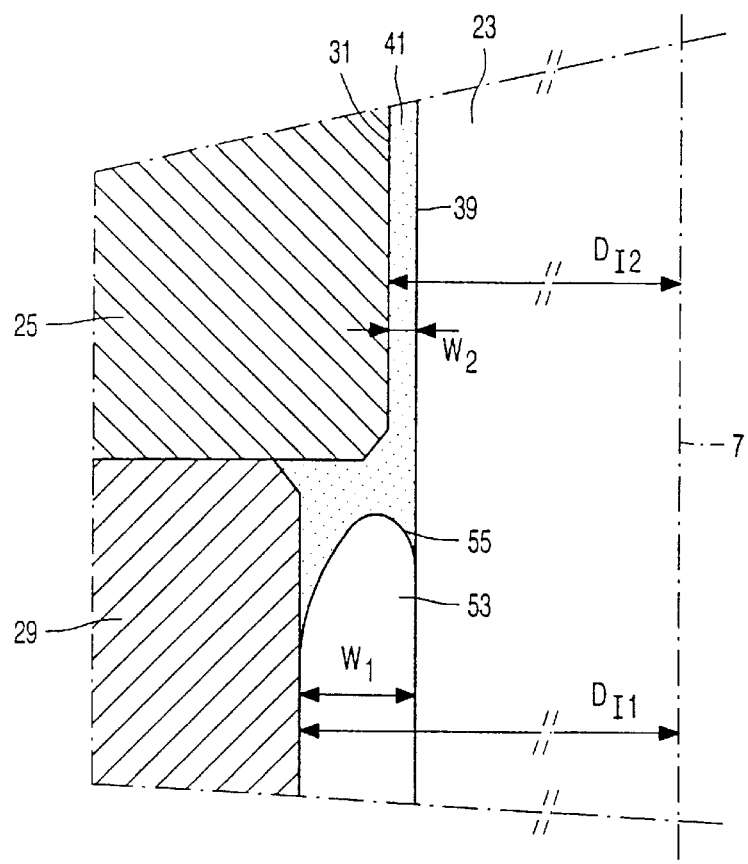
FIG. 3 is a detailed view of an interface between a ring-shaped body and two co-operating bearing surfaces of the dynamic groove bearing of the electric motor shown in FIG. 1, and FIG. 4 diagrammatically shows a scanning device in accordance with the invention, which is provided with an electric motor and a dynamic groove bearing in accordance with the invention.

As shown in FIG. 1 and, in detail, in FIG. 3, the ring-shaped body 29 has an inner diameter $D_{11}$ which is greater than an inner diameter $D_{12}$ of the bearing surfaces 31 and 35 of the bearing bushes 25 and 27. As a result, as shown in FIG. 3, a ring-shaped chamber 53 having a width $w_1$ which substantially exceeds a width $w_2$ of the bearing slits 41 and 43 is present between the ring-shaped body 29 and the shaft 23. Owing to said difference between the widths $w_1$ and $w_2$, a lubricant meniscus 55 is formed near the interfaces between the ring-shaped body 29 and the bearing slits 41 and 43 present between the co-operating bearing surfaces 31, 39 and 35, 39, which lubricant meniscus is caused by capillary liquid forces present in the bearing slits 41 and 43. As shown in FIG. 3, the lubricant meniscus 55 provides a continuous lubricant supply from the ring-shaped body 29 to the two bearing slits 41 and 43, so that a reliable, uninterrupted lubricant supply to the two groove patterns 33, 37 is obtained. It is noted that the position of the lubricant meniscus 55 in the ring-shaped chamber 53 depends on the quantity of lubricant in the dynamic groove bearing 9. There may even be so much lubricant in the dynamic groove bearing 9 that also the ring-shaped chamber 53 is entirely filled with lubricant. In such a case, however, also a reliable, uninterrupted lubricant supply from the ring-shaped body 29 to the two bearing slits 41 and 43 is obtained.

Figure 2:
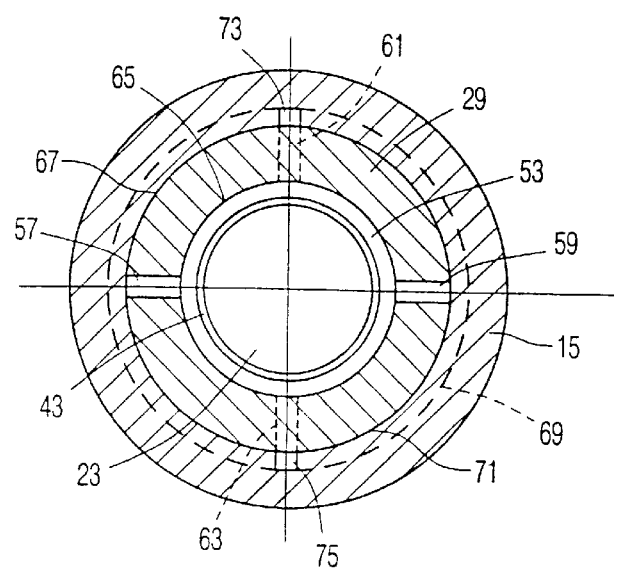
FIG. 2 is a sectional view taken on the line II—II in FIG. 1.

As shown in FIG. 2, the ring-shaped body 29 is provided with a first pair of vent ducts 57 and 59 which are arranged so as to be diametrically opposite one another, and a second pair of vent ducts 61 and 63 which are also arranged so as to be diametrically opposite one another. The vent ducts 57, 59, 61, 63 extend from an inner wall 65 of the ring-shaped body 29 to an outer wall 67 of the ring-shaped body 29 and, near the outer wall 67 of the ring-shaped body 29, each of the vent ducts 57, 59, 61, 63 opens into a common vent line of the external bearing part 17. The first pair of vent ducts 57 and 59, which is also shown in section in FIG. 1, opens into the inner wall 65 of the ring-shaped body 29, near the first bearing bush 25 and the groove pattern 33, while the second pair of vent ducts 61 and 63, of which only the vent duct 61 is shown in FIG. 1, opens into the inner wall 65 of the ring-shaped body 29, near the second bearing bush 27 and the groove pattern 37. The vent line of the external bearing part 17 includes a ring-shaped duct 69 into which the vent ducts 57, 59, 61, 63 open. The ring-shaped duct 69 is provided in an inner wall 71 of the bearing housing 15 and surrounds the ring-shaped body 29. The vent line of the external bearing part 17 further includes two straight ducts 73 and 75 which are also provided in the inner wall 71 of the bearing housing 15 and connect to the ring-shaped duct 69. The straight ducts 73 and 75 are diametrically arranged with respect to each other, extend substantially parallel to the axis of rotation 7 and open into a ring-shaped groove 77, shown in FIG. 1, which is provided near a second end 79 of the bearing housing 15. The vent ducts 57, 59, 61, 63 serve to discharge the air present in the dynamic groove bearing 9 when the groove bearing 9 is filled, in the manufacturing process, with the lubricant. Since the vent ducts 57, 59, 61, 63 are situated between the two groove patterns 33, 37, said vent ducts 57, 59, 61, 63 additionally provide a necessary mutual decoupling of the pressure profiles generated in the bearing slits 41, 43 by the two groove patterns 33, 37. The vent ducts 57, 59, 61, 63 can be readily provided in the ring-shaped body 29 in the course of the manufacture of said ring-shaped body 29, while the ring-shaped duct 69 and the straight ducts 73, 75 can also be readily provided in the bearing housing 15, so that a very simple and practical construction of the dynamic groove bearing 9 is obtained. It is noted that, instead of the two pairs of vent ducts 57, 59 and 61, 63, the ring-shaped body 29 may be provided with a different number of vent ducts, such as a single vent duct which extends from the inner wall 65 of the ring-shaped body 29 to the outer wall 67 of the ring-shaped body 29, or two vent ducts, a first one of which opens into the inner wall 65 close to the groove pattern 33, and a second one opens into the inner wall 65 close to the groove pattern 37. By using two or more vent ducts in the ring-shaped body 29, air venting from the dynamic groove bearing 9 during the filling thereof with the lubricant is substantially improved.

Figure 4:
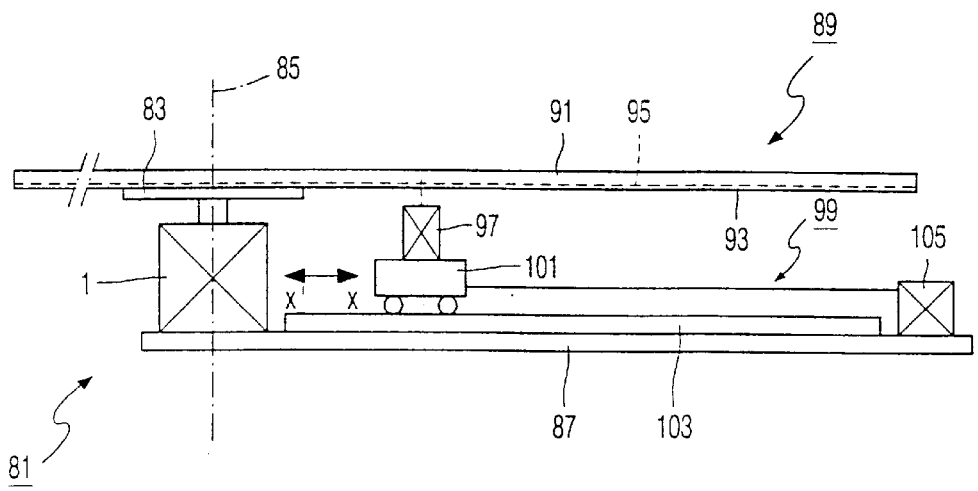

FIG. 4 diagrammatically shows a scanning device 81 in accordance with the invention, which comprises a support 83 which can be rotated about an axis of rotation 85 and driven by means of an electric motor 1 in accordance with the invention, which is mounted onto a frame 87. An optically scannable information carrier 89, such as a CD, a CD-ROM or a DVD can be placed on the support 83, said optically scannable information carrier being provided with a disc-shaped carrier 91 and a transparent protective layer 93. A side of the carrier 91 bordering on the protective layer 93 forms an information layer 95 of the information carrier 89 on which a spiral-shaped information track is present. The scanning device 81 further comprises an optical scanning unit 97 for optically scanning the information track of the information carrier 89. The scanning unit 97 can be displaced, by means of a displacement device 99 of the scanning device 81, relatively to the axis of rotation 85 in predominantly two opposite radial directions X and X'. For this purpose, the scanning unit 97 is secured to a slide 101 of the displacement device 99 which is further provided with a straight guiding means 103 which extends parallel to the X direction and is provided on the frame 87, over which guiding means the slide 101 is displaceably guided, and an electric motor 105 by means of which the slide 101 can be moved over the guiding means 103. In operation, an electrical control unit of the scanning device 81, not shown controls the motors 1 and 105 and causes the information carrier 89 to be rotated about the axis of rotation 85 as well as the scanning unit 97 to be displaced parallel to the X-direction, in such a manner that the spiral-shaped information track present on the information carrier 89 is scanned by the scanning unit 97. During scanning, information present on the information track can be read by the scanning unit 97 or information can be written on the information track by the scanning unit 97.

The above-described scanning device 81 in accordance with the invention is an optical scanning device wherein a rotatable information carrier is optically scanned by means of an optical scanning unit. It is noted that the invention also covers other types of scanning devices, such as a magnetic scanning device for a magneto-optical scanning device wherein a rotatable information carrier is scanned in a magnetic or magneto-optical manner by means of a magnetic or magneto-optical scanning unit.

It is further noted that an electric motor in accordance with the invention and a dynamic groove bearing in accordance with the invention cannot only be employed in a scanning device in accordance with the invention but also in other types of devices, such as a rotatable magnetic scanning unit which is used in a magnetic tape apparatus, or a rotatable polygon mirror which is used in an optical scanning device such as a bar code reader.

In the above-described dynamic groove bearing 9 in accordance with the invention, the internal bearing part is rotatable with respect to the external bearing part, and the groove patterns are provided in the external bearing part. It is finally noted that the invention also comprises dynamic groove bearings in which the external bearing part is rotatable with respect to the internal bearing part, and dynamic groove bearings wherein the groove patterns are provided on the internal bearing part.

What is claimed is:

1. A dynamic groove bearing comprising:

an internal bearing part and an external bearing part which can be rotated relatively to each other about an axis of rotation, a bearing surface of one of the bearing parts being provided with two groove patterns for co-operation with a bearing surface of the other bearing part, said groove patterns being spaced axially from each other, and a reservoir comprising a ring-shaped body made from a porous material and arranged in the external bearing part, for holding a lubricant which, in operation, is present between the co-operating bearing surfaces, the reservoir being arranged, in the axial direction, between the two groove patterns, and the ring-shaped body having an internal diameter which is larger than an internal diameter of the bearing surface of the external bearing part, characterized in that the external bearing part includes an axially extending vent line, and the ring-shaped body is provided with at least one vent duct which extends from an inner wall of the ring-shaped body to an outer wall of the ring-shaped body and opens, near the outer wall of the ring-shaped body, into said vent line of the external bearing part.

2. A bearing as claimed in claim 1, characterized in that:

said external bearing part comprises a bearing housing, a first bearing bush and a second bearing bush extending axially within said housing, the ring-shaped body being arranged between said bearing bushes, the two groove patterns are provided on an inner wall of, respectively, the first bearing bush and the second bearing bush, which form part of the external bearing part, and said vent line extends at least from said vent duct to an end of one of said bearing bushes remote from the ring-shaped body.

3. A bearing as claimed in claim 2, characterized in that said vent line is formed in said housing and extends along an outer wall of said one of said bearing bushes.

4. An electric motor comprising a dynamic groove bearing as claimed in claim 1, said motor including a stator and a rotor which is mounted so as to be rotatable with respect to the stator by means of said dynamic groove bearing, said stator being secured to one of said bearing parts of the dynamic groove bearing, and said rotor being secured to the other bearing part.

5. A scanning device comprising an electric motor as claimed in claim 4, said scanning device further comprising:

a support for an information carrier, said support being rotatable about said axis of rotation by said electric motor, a scanning unit for scanning the information carrier, and a displacement device for displacing the scanning unit relatively to said support at least in a direction transverse to said axis of rotation.

6. A dynamic groove bearing comprising:

an internal bearing part and an external bearing part which can be rotated relatively to each other about an axis of rotation, a bearing surface of one of the bearing parts being provided with two groove patterns for co-operation with a bearing surface of the other bearing part, said groove patterns being spaced axially from each other, and a reservoir comprising a ring-shaped body made from a porous material and arranged in the external bearing part, for holding a lubricant which, in operation, is present between the co-operating bearing surfaces, the reservoir being arranged, in the axial direction, between the two groove patterns, and the ring-shaped body having an internal diameter which is larger than an internal diameter of the bearing surface of the external bearing part, characterized in that the external bearing part includes a vent line, the ring-shaped body is provided with a first vent duct which opens into an inner wall of the ring-shaped body, close to one of the two groove patterns, and a second vent duct which opens into the inner wall of the ring-shaped body, close to the other of the two groove patterns, the two vent ducts opening into a ring-shaped duct of the external bearing part, close to the outer wall of the ring-shaped body, said ring-shaped duct surrounding the ring-shaped body and forming part of said vent line.

7. A bearing as claimed in claim 6, characterized in that:

said external bearing part comprises a bearing housing, a first bearing bush and a second bearing bush extending axially within said housing, the ring-shaped body being arranged between said bearing bushes, the two groove patterns are provided on an inner wall of, respectively, the first bearing bush and the second bearing bush, which form part of the external bearing part, and said vent line extends at least from said vent duct to an end of one of said bearing bushes remote from the ring-shaped body.

8. A bearing as claimed in claim 6, characterized in that: the ring-shaped body is provided with two said first vent ducts diametrically arranged with respect to each other, and two said second vent ducts diametrically arranged with respect to each other.

9. A bearing as claimed in claim 8, characterized in that said two first vent ducts are arranged along a first diameter, and said two second vent ducts are arranged along a second diameter angularly arranged transversely to said first diameter.

10. An electric motor comprising a dynamic groove bearing as claimed in claim 6, said motor including a stator and a rotor which is mounted so as to be rotatable with respect to the stator by means of said dynamic groove bearing, said stator being secured to one of said bearing parts of the dynamic groove bearing, and said rotor being secured to the other bearing part.

11. A scanning device comprising an electric motor as claimed in claim 10, said scanning device further comprising:

a support for an information carrier, said support being rotatable about said axis of rotation by said electric motor, a scanning unit for scanning the information carrier, and a displacement device for displacing the scanning unit relatively to said support at least in a direction transverse to said axis of rotation.

* * * * *